United States Patent
Wu (10) Patent No.: US 9,815,441 B2
(45) Date of Patent: Nov. 14, 2017

(54) BRAKE MEASURING GAUGE AND METHOD

(71) Applicant: Cheng-Jie Wu, Changhua (TW)

(72) Inventor: Cheng-Jie Wu, Changhua (TW)

( * ) Notice: Subject to any disclaimer, the term of this patent is extended or adjusted under 35 U.S.C. 154(b) by 130 days.

(21) Appl. No.: 14/843,859

(22) Filed: Sep. 2, 2015

(65) Prior Publication Data

US 2017/0059431 A1 Mar. 2, 2017

(51) Int. Cl.
   *G01B 5/00* (2006.01)
   *B60T 7/10* (2006.01)
   *B60T 11/04* (2006.01)
   *F16D 125/60* (2012.01)
   *F16D 125/64* (2012.01)

(52) U.S. Cl.
   CPC ............ *B60T 7/102* (2013.01); *B60T 11/046* (2013.01); *G01B 5/00* (2013.01); *F16D 2125/60* (2013.01); *F16D 2125/64* (2013.01)

(58) Field of Classification Search
   CPC ........ G01B 5/0028; G01B 5/08; G01B 21/14; G01B 3/205; G01B 5/12; G01B 5/14; G01L 5/28; G01L 19/00; G01L 19/08; G01L 19/12; G01L 1/086; G01L 5/10
   USPC .......................................................... 33/609
   See application file for complete search history.

(56) References Cited

U.S. PATENT DOCUMENTS

| | | | | |
|---|---|---|---|---|
| 4,791,732 A | * | 12/1988 | Bruno, Jr. | B23B 47/28 33/578 |
| 4,872,268 A | * | 10/1989 | Perrault | A61B 5/103 33/391 |
| 7,699,607 B2 | * | 4/2010 | Margossian | A61C 19/045 33/511 |
| 2006/0283037 A1 | * | 12/2006 | Galle | G01B 5/08 33/783 |
| 2014/0250995 A1 | * | 9/2014 | Vaeretti | B60T 17/223 73/132 |
| 2017/0059431 A1 | * | 3/2017 | Wu | G01L 5/28 |

* cited by examiner

*Primary Examiner* — Yaritza Guadalupe-McCall
(74) *Attorney, Agent, or Firm* — Che-Yang Chen; Law Offices of Scott Warmuth (57) ABSTRACT

A brake measuring gauge and method are disclosed. The measuring gauge comprises two measuring rods and a horizontal rule. Each of the two measuring rod has at least a connecting rod formed at an end of the measuring rod to engage with a nut. The horizontal ruler has a central hole formed at a central portion of a surface thereof, and two through holes are formed at relative positions on two ends of the horizontal ruler, and two scales are separately formed at a lateral side of the horizontal ruler. By using the measuring gauge to measure and calculate the dimensions of components of the brake rotor, the user can obtain precise sizes of the adapter bases for different types of the calipers or the brake discs.

9 Claims, 13 Drawing Sheets

BRAKE MEASURING GAUGE AND METHOD

FIELD OF THE INVENTION

The present invention relates to a brake measuring gauge and method, and more particularly to a brake measuring gauge and method for estimating a precise size of an adapter base.

BACKGROUND OF THE INVENTION

Nowadays, the disc-type brake system is the most commonly used form of brake for vehicles because of its better stopping performance, and the stopping performance of vehicle depends on the quality of a disc brake system. A size of disc brake is designed relative to a size of a wheel rim, for example, a fifteen inches wheel rim is usually equipped with a 260 mm brake disc, and the maximum size it can be equipped is up to 290 mm. Also, a standard size of the brake disc is equipped for a sixteen inches wheel rim is around 300. When a vehicle needs to replace a larger brake disc and a larger caliper, it needs to mount an adapter base on the wheel rim which parallel extends from the wheel rim to equip the caliper.

However, conventional brake measuring gauge and method is disadvantageous because: (i) there are varieties of vehicles on the market, and most of the brake rotor thereof has specific size and is incompatible with others, resulting in a user having to cost much time and effort to obtain the specific size of the adapter base; and (ii) the measuring method for the brake system varies for each individual, and has not had a standard yet. It is difficult to obtain an accurate measurement on the size of the adapter base, and a brake pad in the brake disc or the caliper has much chance to be worn because of incorrect measurement. Therefore, there remains a need for a new and improved design for a brake measuring gauge and method to overcome the problems presented above.

SUMMARY OF THE INVENTION

The present invention provides a brake measuring gauge and method, which is used to measure sizes of adapter bases for different types of calipers or brake discs in replacing process. The measuring gauge comprises two measuring rods and a horizontal rule. Each of the two measuring rod has at least a threaded section formed at an end of the measuring rod to engage with a nut. The horizontal ruler has a central hole formed at a central portion of a surface thereof, and two through holes are formed at relative positions on two ends of the horizontal ruler, and two scales are separately formed at a lateral side of the horizontal ruler. By using the measuring gauge to measure and calculate the dimensions of components of the brake rotor, the user can obtain precise sizes of the adapter bases for different types of the calipers or the brake discs.

Comparing with conventional brake measuring gauge and method, the present invention is advantageous because: (i) by using the measuring gauge to measure and calculate the dimensions of components of the brake rotor, the user can obtain precise sizes of the adapter bases for different types of the calipers or the brake discs. As a result, the brake measuring gauge and method can reduce the cost of measurement and save measurement time; and (ii) the precise size of the adapter base can improve the stableness of the caliper and the brake disc thereon, and prevent the caliper and the brake disc from additional abrasion because of incorrect measurement, resulting in increasing the life time of the caliper and the brake disc and improving the brake performance.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
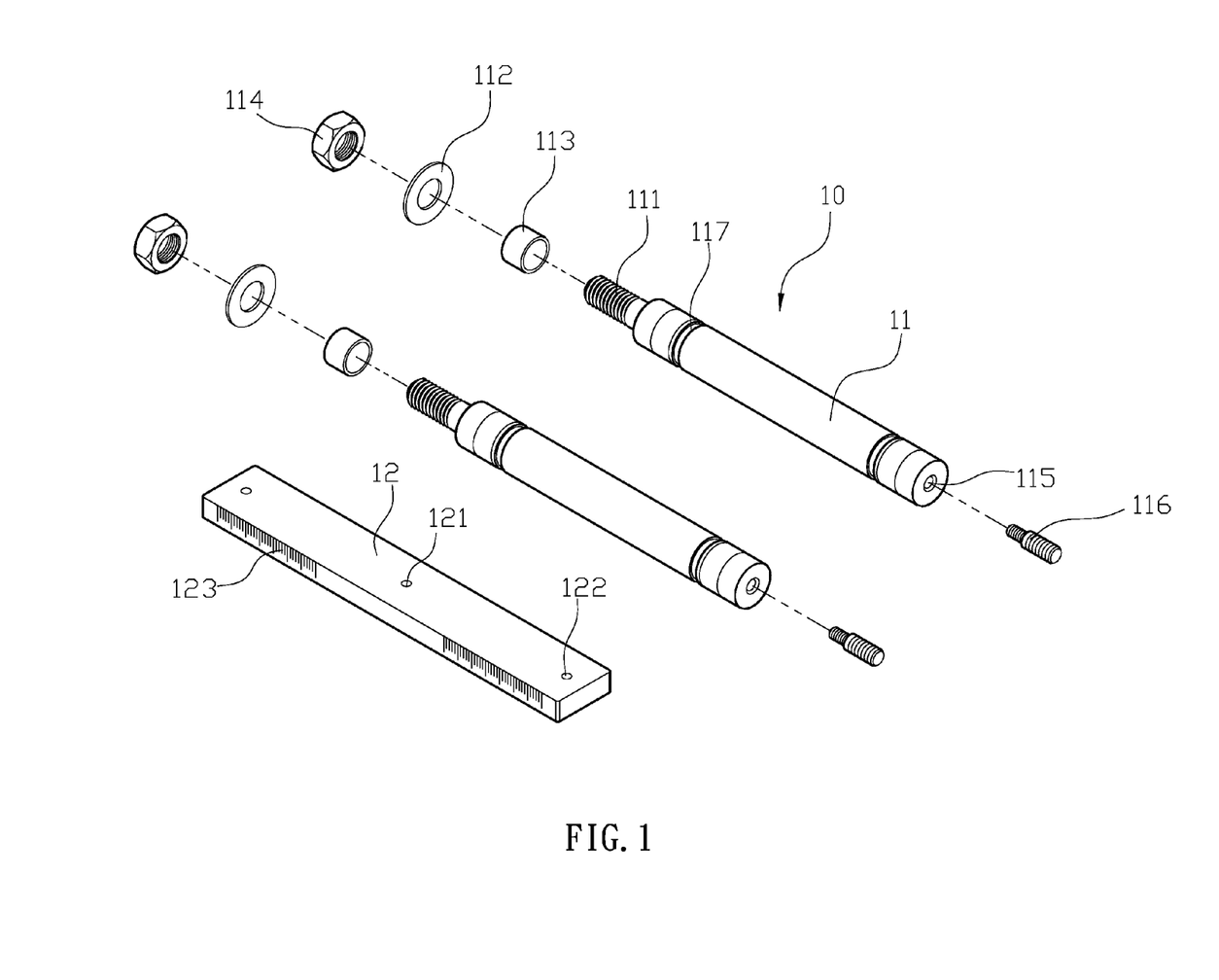
FIG. 1 is a schematic view of the brake measuring gauge of the present invention.

In order to further understand the goal, characteristics and effect of the present invention, a number of embodiments along with the drawings are illustrated as following:

Referring to FIG. 1, the present invention provides a brake measuring gauge and method, and the brake measuring gauge (10) comprises of two measuring rods (11) and a horizontal ruler (12). Each of the two measuring rods (11) has a connecting rod (111) formed at a first end thereof to connect to a gasket (112), a sleeve (113) and a nut (114), and each of two second ends on the measuring rods (11) has a screwing hole (115) to connect to a threaded rod (116). A diameter of the threaded rod (116) is smaller than the connecting rod (111), and each of the two measuring rods (11) has an engaging groove (117). The horizontal ruler (12) has a central hole (121) formed at a central portion thereof, and two through holes (122) are formed at relative positions on two ends of the horizontal ruler (12), and two scales (123) are separately formed at a lateral side of the horizontal ruler (12).

Figure 2:
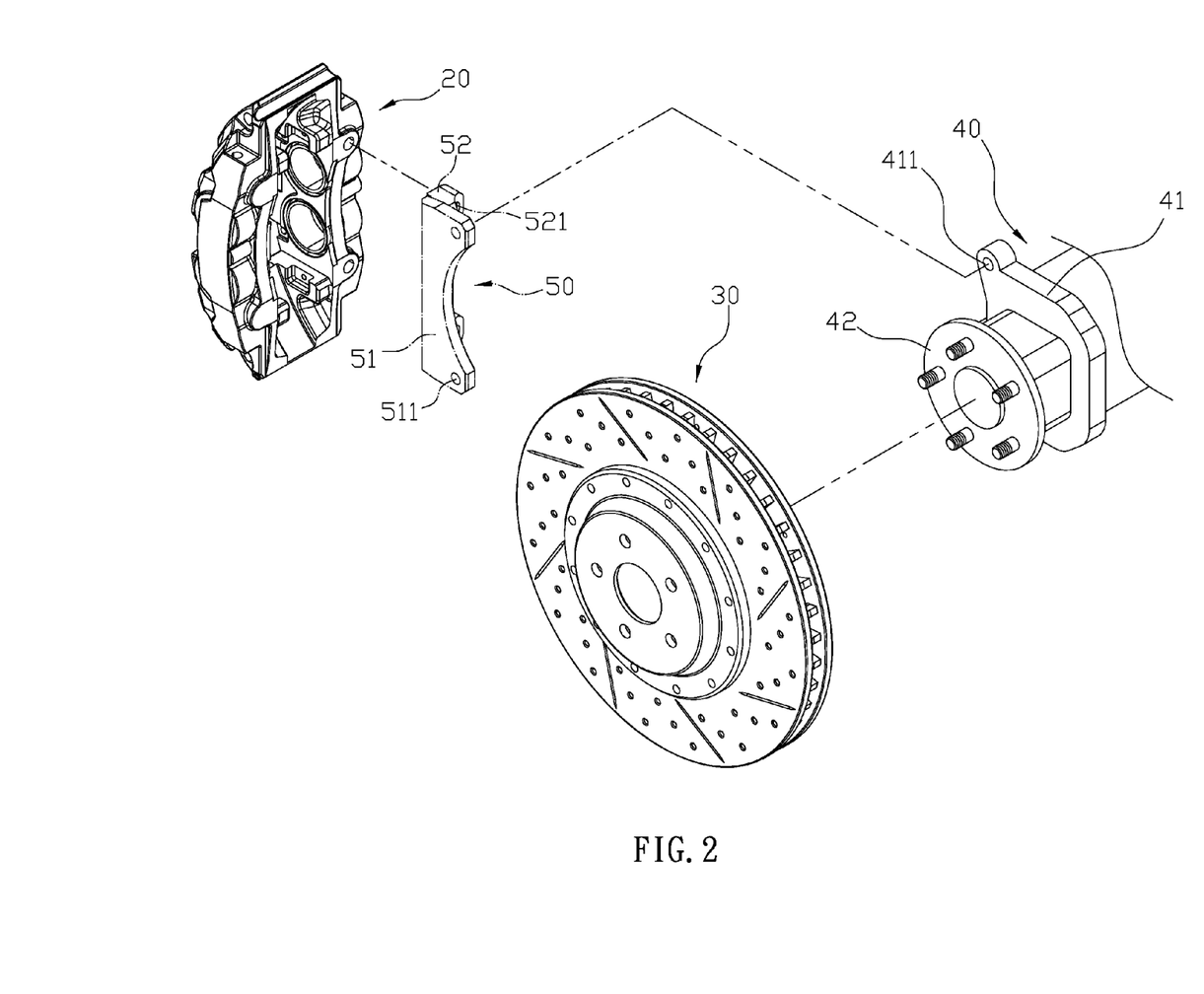
FIG. 2 is a schematic view of the brake measuring gauge of present invention in replacing process.
Figure 3:
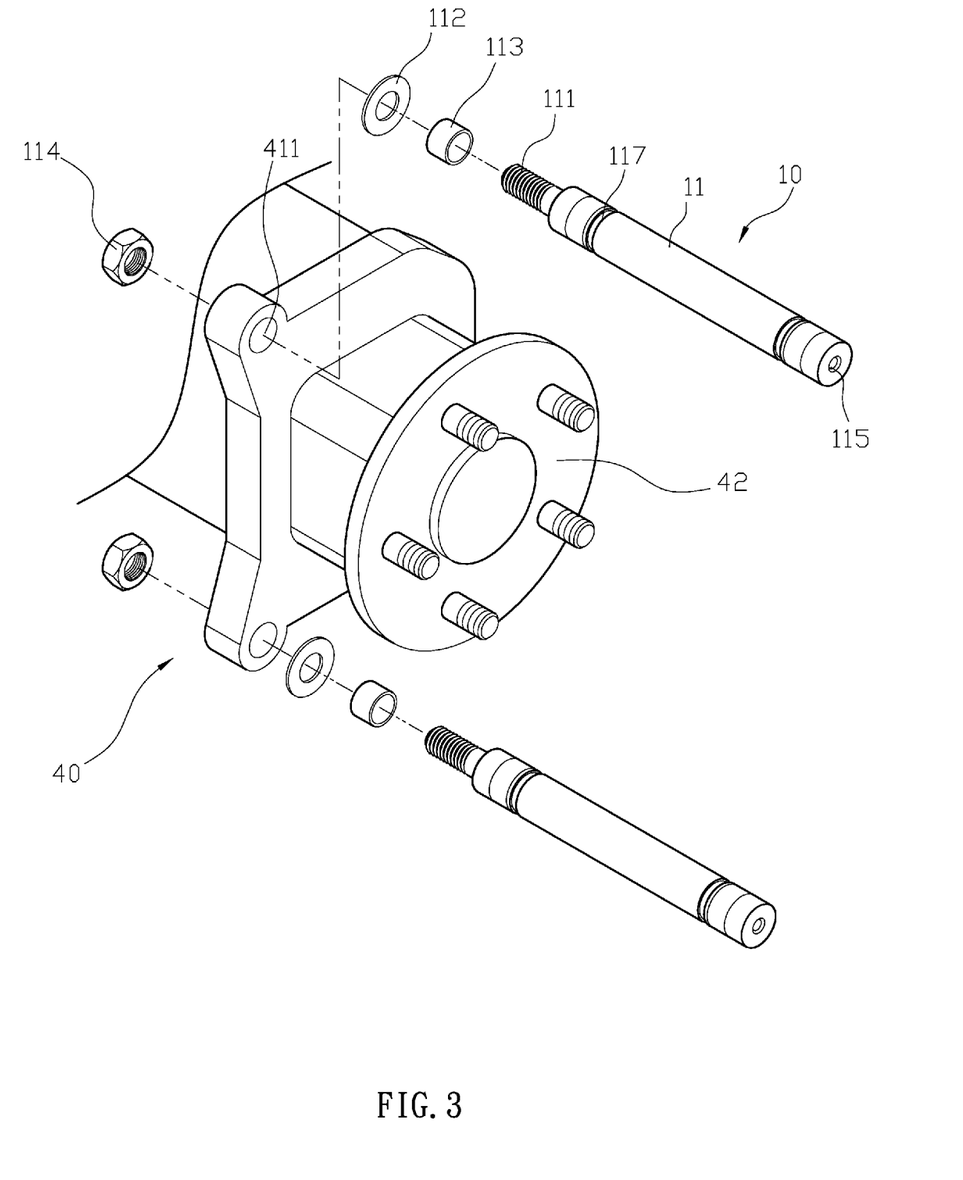
FIG. 3 is an exploded view of the brake measuring gauge and method of present invention used for the first step of the measurement.

Referring to FIGS. 1 and 2, the brake measuring gauge and method in present invention is used on the replacing process of a caliper (20) or a brake disc (30), and the measuring gauge (10) can help a user to estimate an accurate size of an L-shaped adapter base (50) having to mount on a brake rotor (40) of the vehicle during the replacing process.

Figure 4:
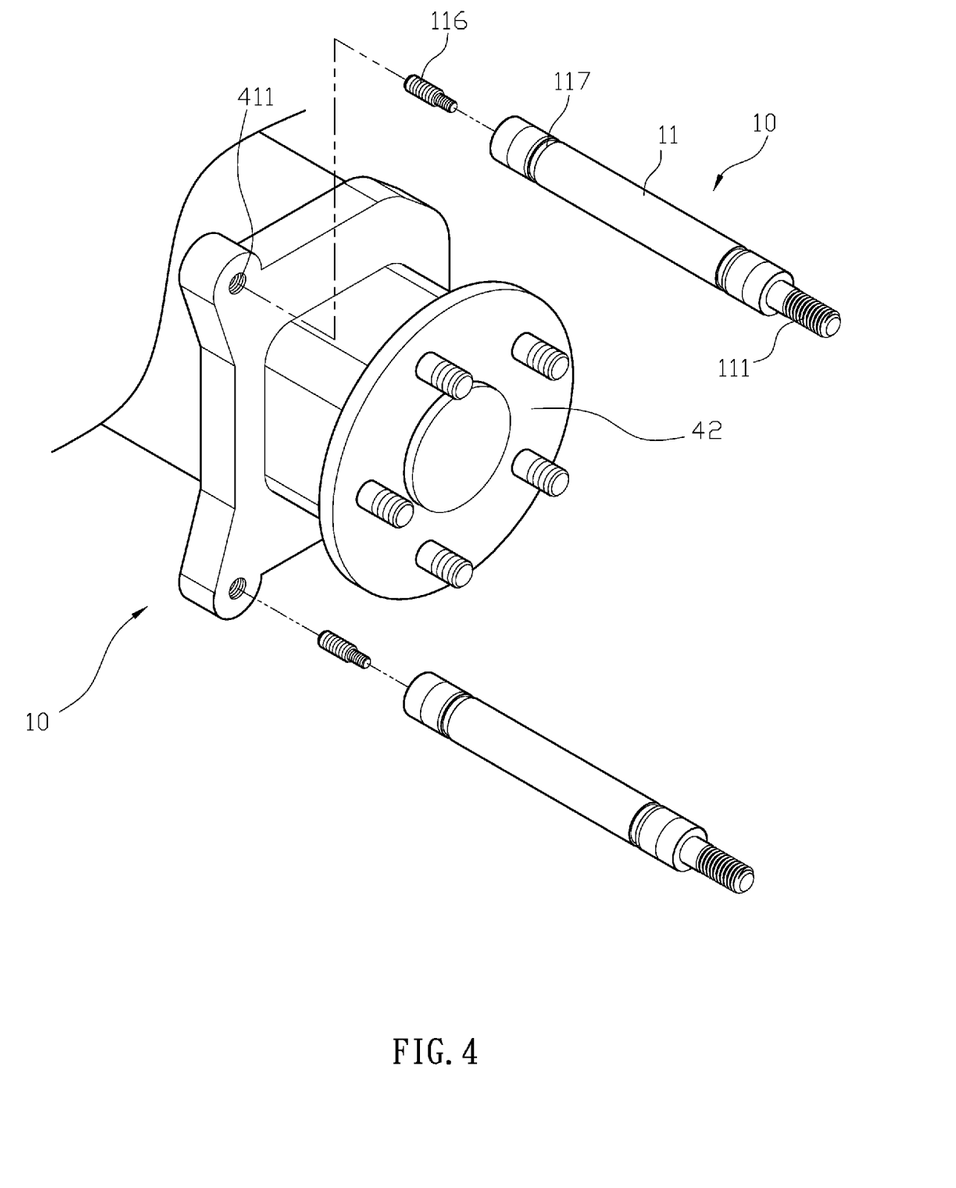
FIG. 4 is an exploded view of another embodiment of the brake measuring gauge and method of present invention used for the first step of the measurement.
Figure 5:
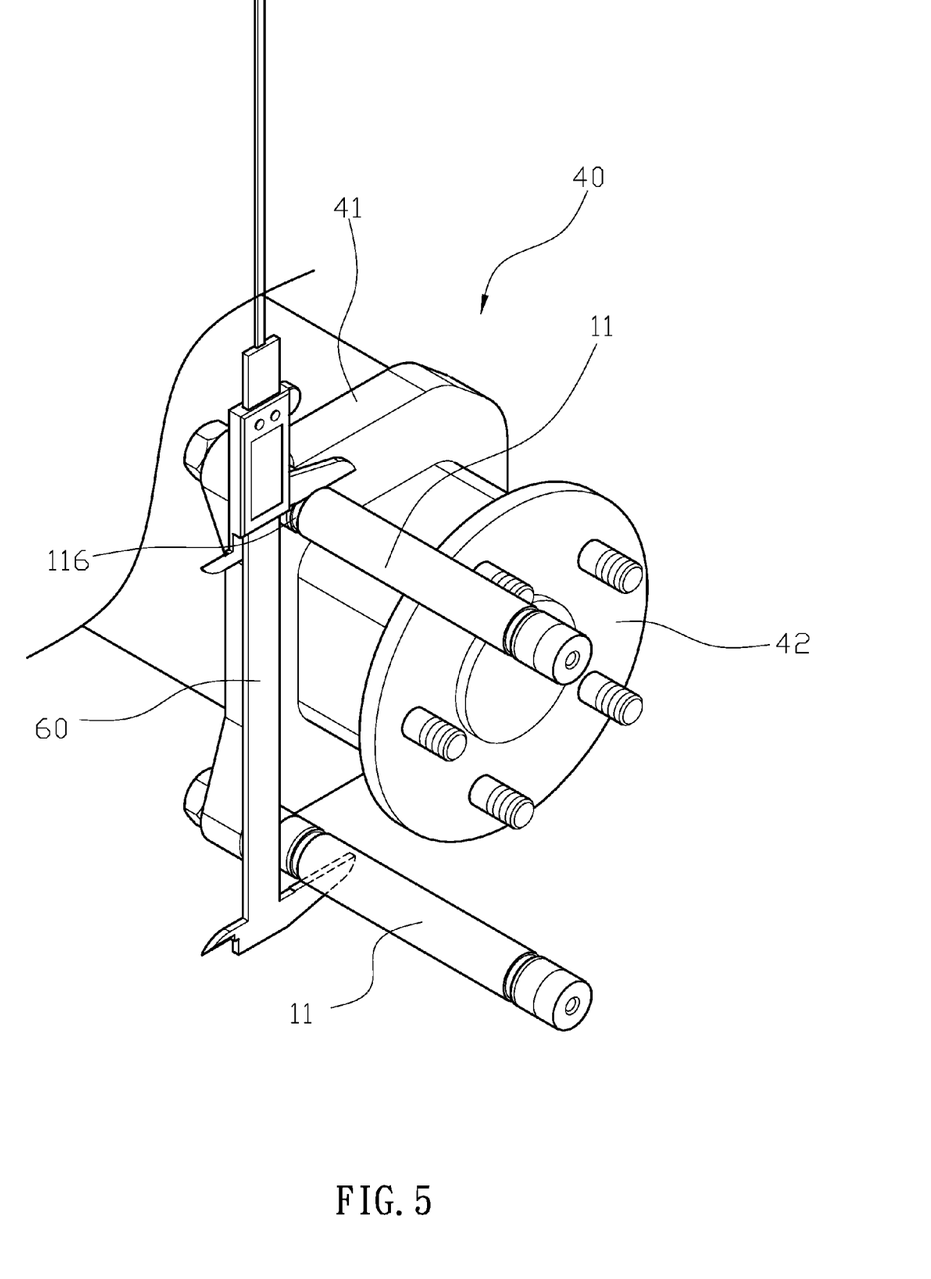
FIG. 5 is a schematic view of the brake measuring gauge and method of present invention used for the first step of the measurement.
Figure 6:
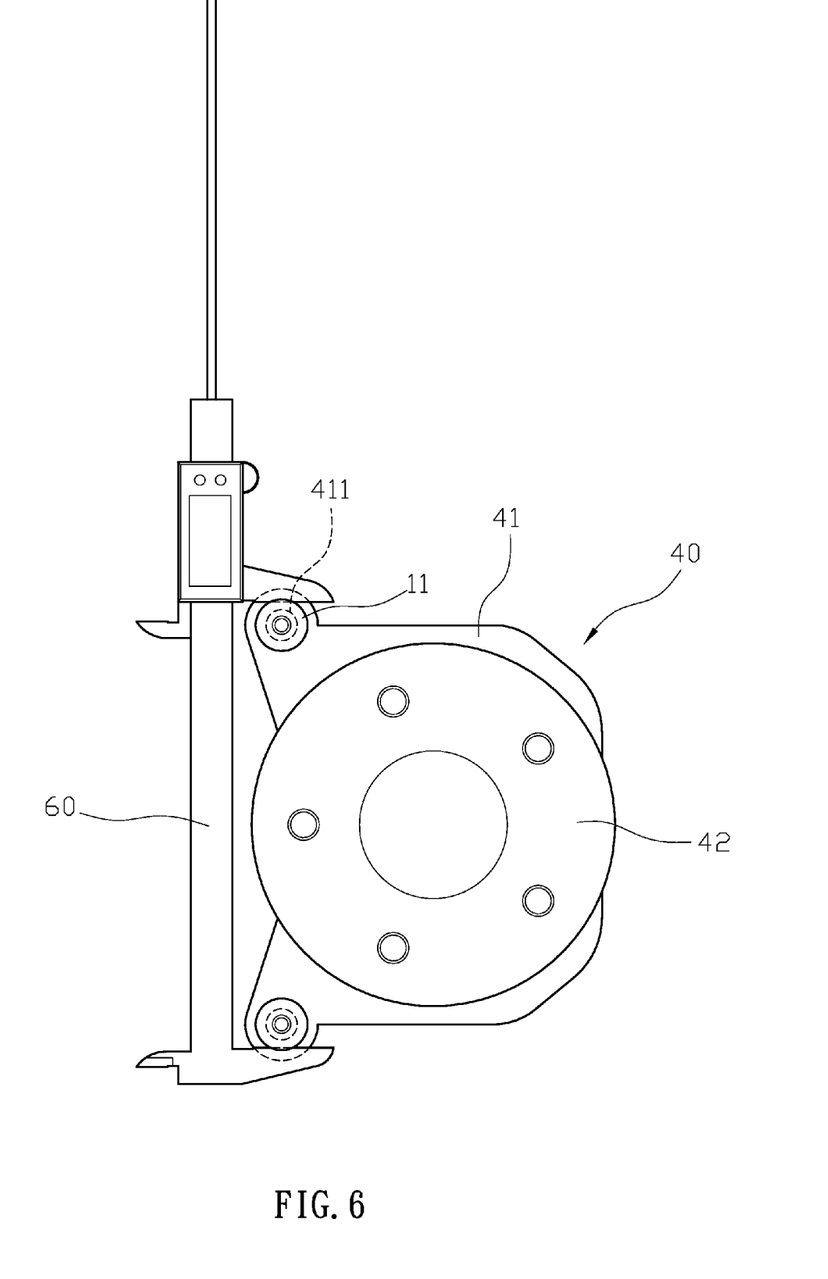
FIG. 6 is a front view of the brake measuring gauge and method of present invention used for the first step of the measurement.
Figure 7:
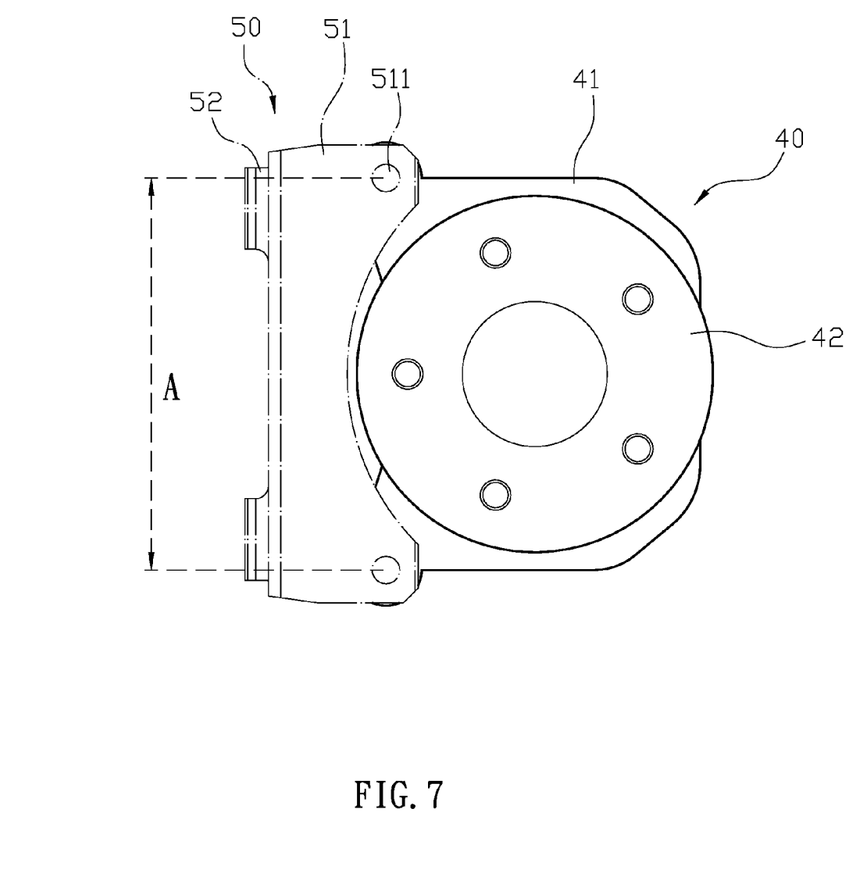
FIG. 7 is a schematic view of the brake measuring gauge and method of present invention used for obtaining the data in the first step of the measurement.

The first part of the measurement is to obtain a distance (A) defined as a horizontal distance between the two connecting holes, which are configured to equip the original caliper. Referring to FIGS. 3 to 7, the first step of the measuring process is to connect each of two measuring rods (11) of the measuring gauge (10) to the connecting hole (411) formed on a rotor base (41) of the brake rotor (40). By inserting each of the two connecting rods (111) through the connecting hole (411) to connect to a nut (114), the two measuring rods (11) can be engaged to the rotor base (41) of the brake rotor (40). Also, each of the two sleeves (113) disposed on a lower end of the connecting rod (111) is configured to bear against an inner periphery of the connecting hole (411) to improve the bonding force between the connecting rod (111) and the connecting hole (411). Also, the measuring rods (11) are steadily secured on the rotor base (41) of the brake rotor (40) to enhance the accuracy of the measurement. Further, when a diameter of the connecting hole (411) is smaller, leading to the connecting rod (111) cannot pass through the connecting hole (411), the user can screw each of the two threaded rods (116) to the screwing hole (115) on the second end of the measuring rod (11), and secure the threaded rods (116) on the connecting holes (411) of the rotor base (41) (as shown in FIG. 4). Then, the user can engage two jaws of a vernier caliper (60) with the engaging grooves (117) to measure a distance between the two measuring rods (11). The distance (A) can be obtained by subtracting each of two radiuses of the measuring rods (11) from the distance between the two measuring rods (11). As a result, the distance between two mounting holes (511) of an adapter body (51) can be determined from the distance (A).

Figure 8:
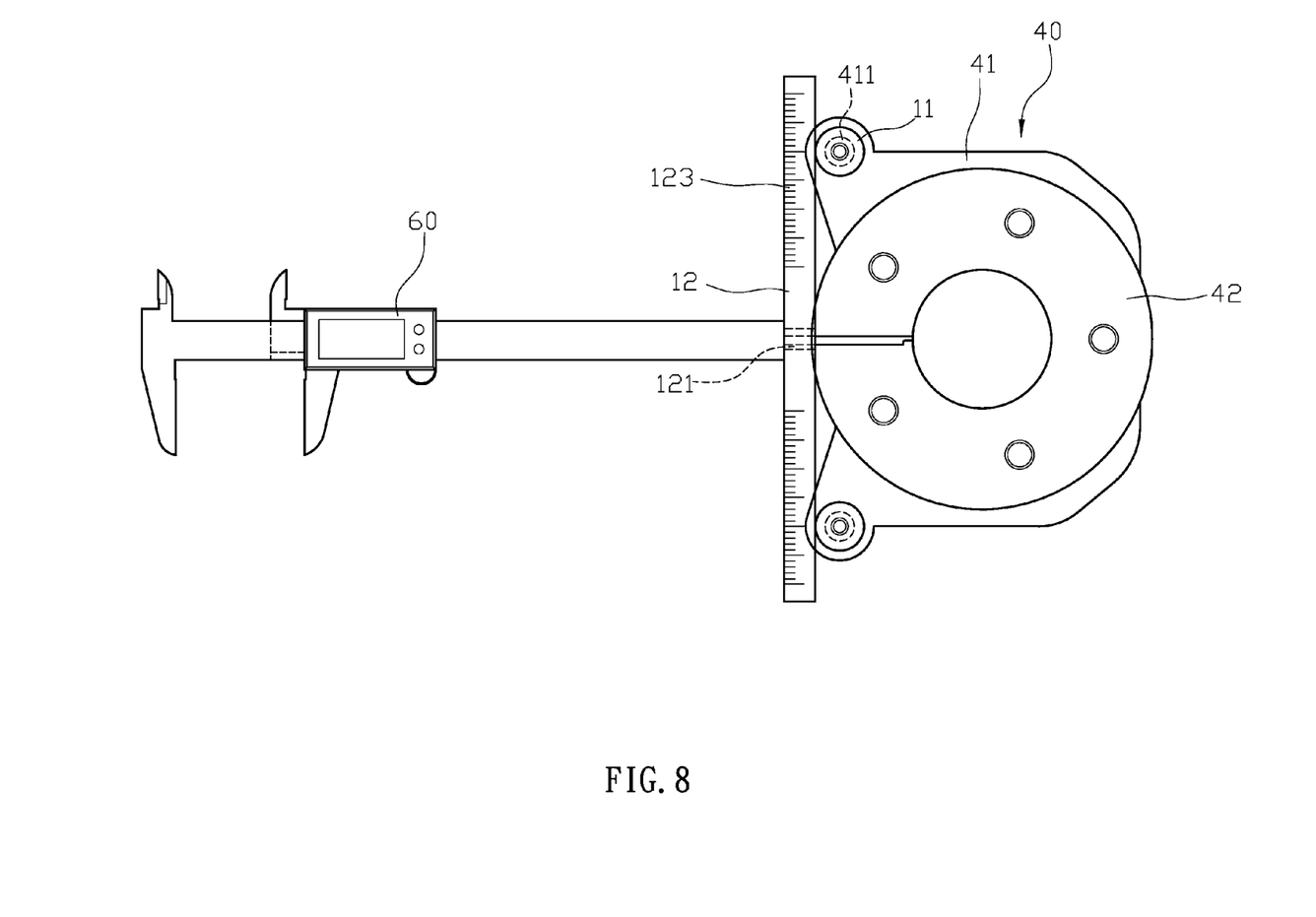
FIG. 8 is a schematic view of the brake measuring gauge and method of present invention used for the second step of the measurement.
Figure 9:
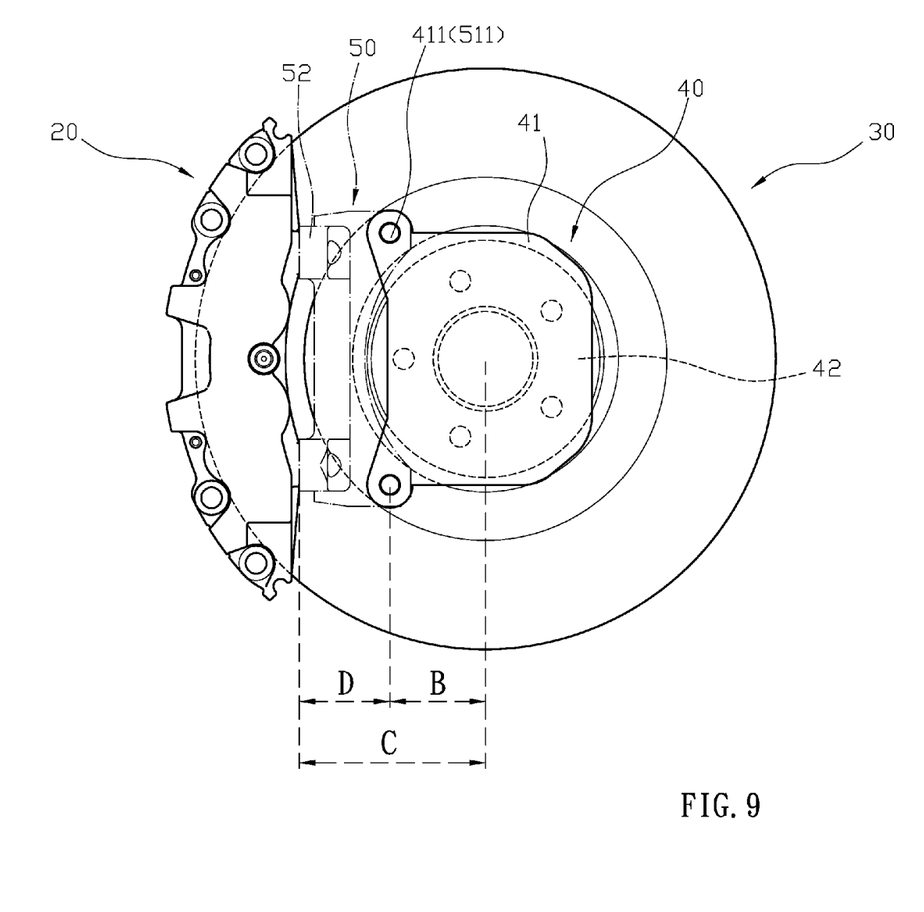
FIG. 9 is a schematic view of the brake measuring gauge and method of present invention used for obtaining the data in the second step of the measurement.

The second part of the measurement is to obtain a distance (B) defined as a horizontal distance between the connecting hole (411) of the brake rotor (40) and a center of the flange (42). Referring to FIGS. 8 to 9, firstly, the user can bear a long edge of the horizontal ruler (12) against the two measuring rods (11), and calibrate both sides of the scales (123) to be symmetric respect to the central hole (121). A horizontal distance between the central hole (121) of the horizontal ruler (12) and an outer periphery of inner circle of the flange (42) can be measured by the vernier caliper (60). The distance (B) can be obtained by subtracting a width of the horizontal ruler (12) and the radius of the measuring rod (11) from a combination of the measured distance by vernier caliper (60) and a radius of the inner circle of the flange (42). A distance (C) defined as an optimized horizontal distance between an edge of the caliper (20) and a center of the brake disc (30) can be calculated by a computer simulating the combined data of the measured distances and the sizes of equipped caliper (20) and brake disc (30). By subtracting the distance (B) from the distance (C), a distance (D) defined as a horizontal distance between a position, which is configured to equip the caliper (20) on the engaging portion (52) of the adapter base (50), and the mounting hole (511) can be obtained.

Figure 10:
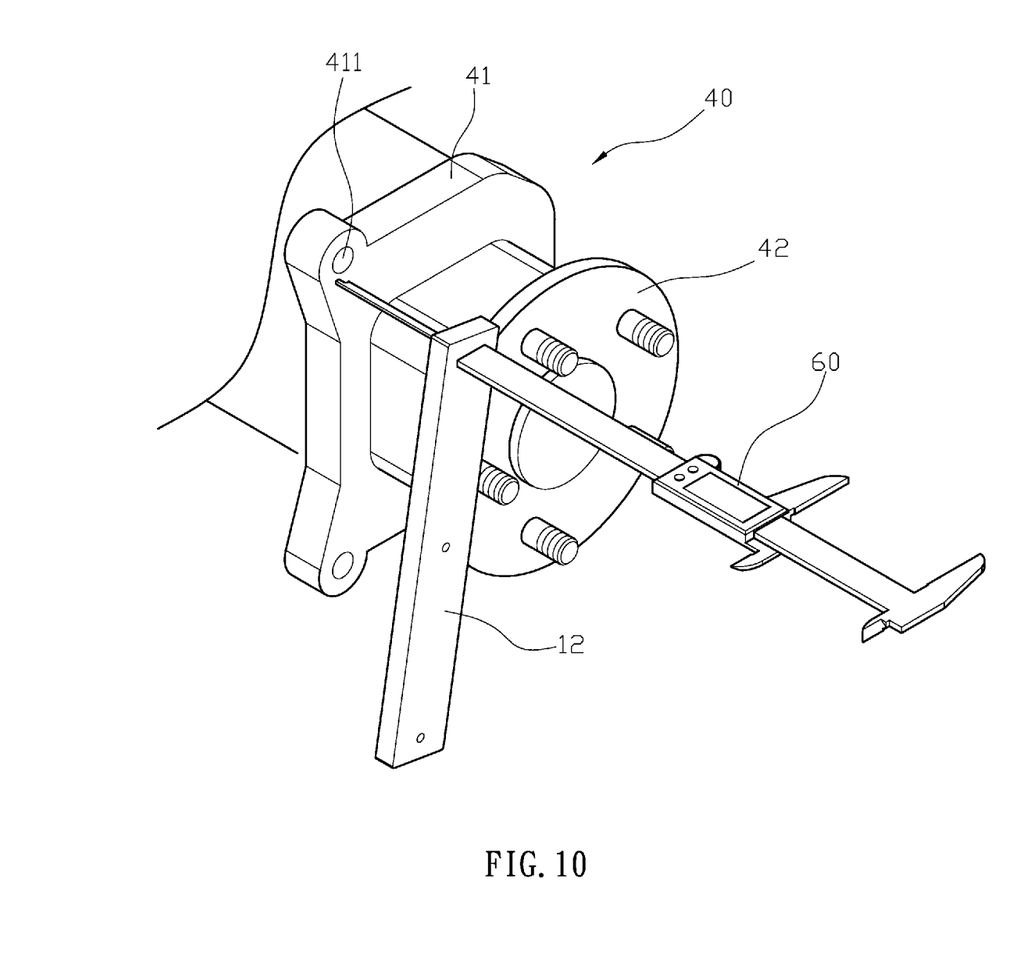
FIG. 10 is a schematic view of the brake measuring gauge and method of present invention used for the third step of the measurement.
Figure 11:
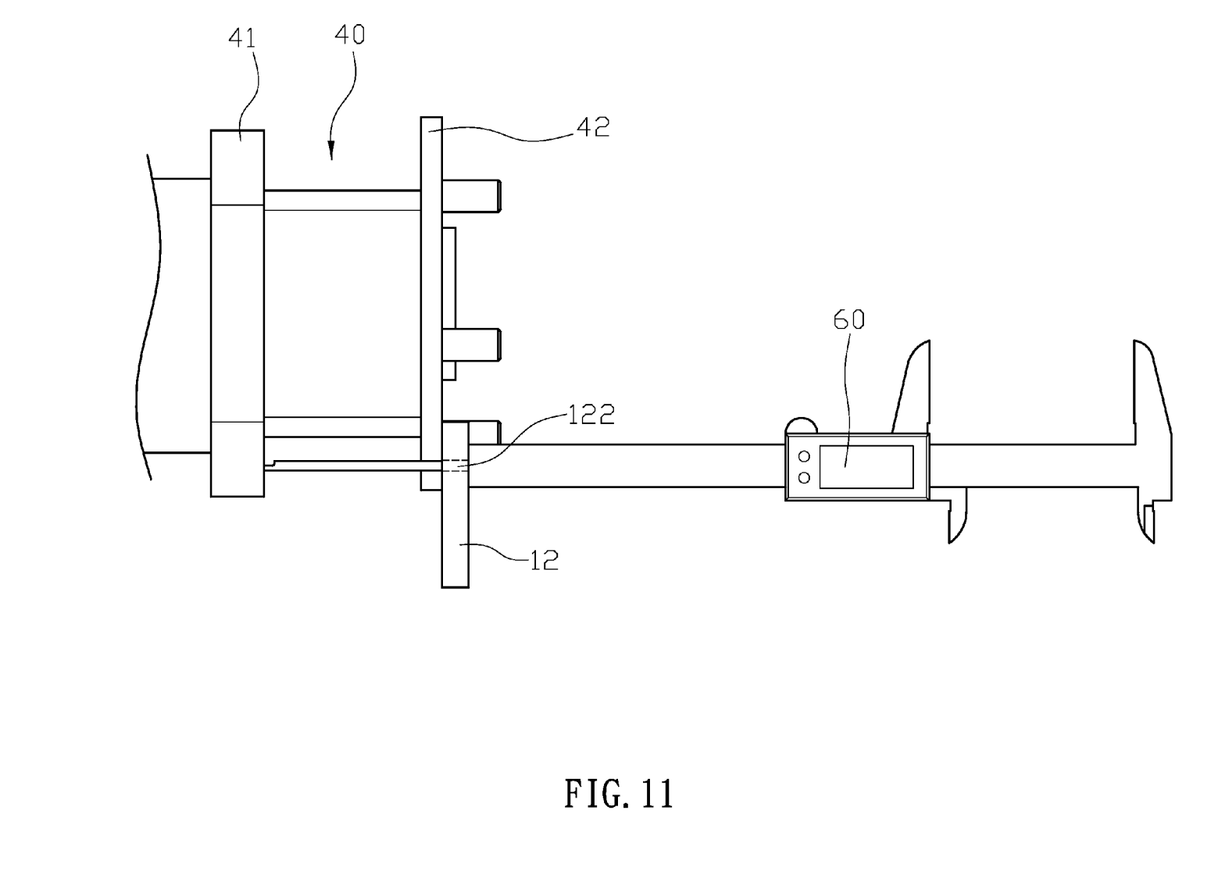
FIG. 11 is a front view of the brake measuring gauge and method of present invention used for the third step of the measurement.
Figure 12:
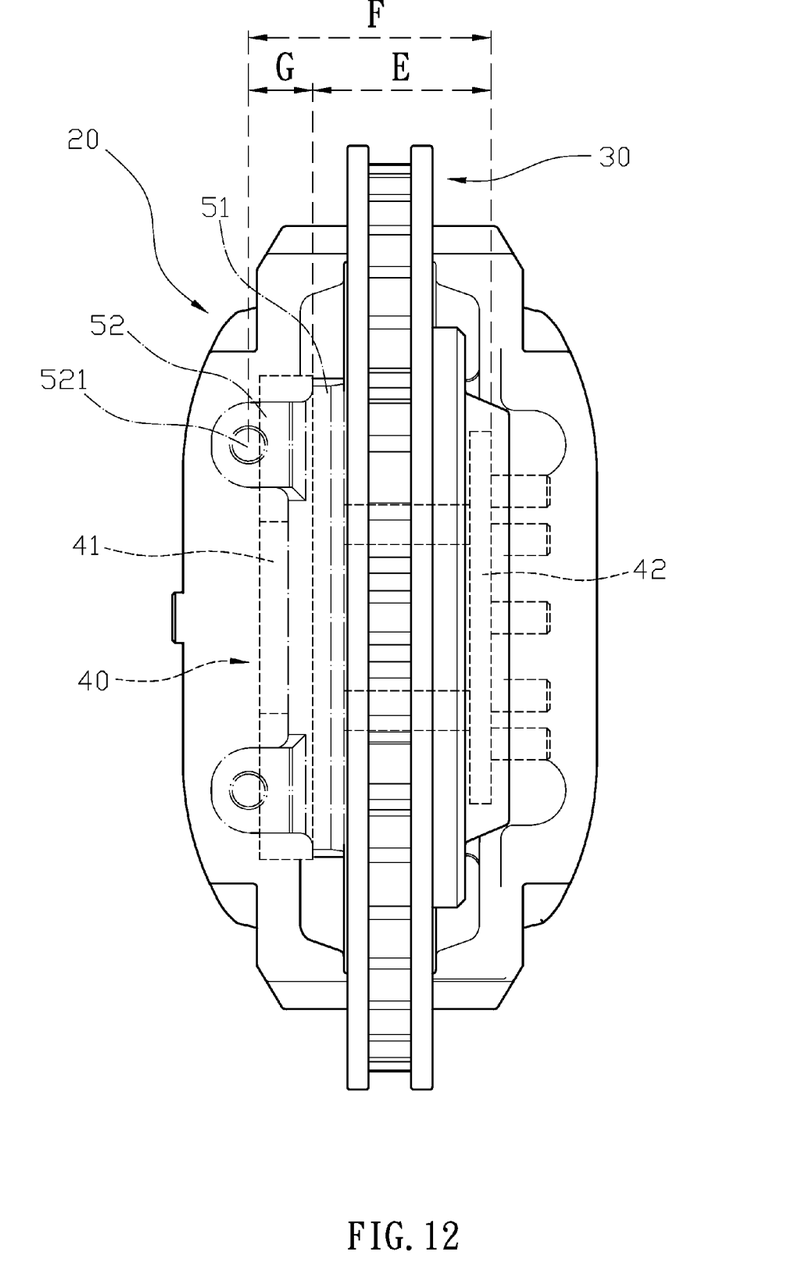
FIG. 12 is a schematic view of the brake measuring gauge and method of present invention used for obtaining the data in the third step of the measurement.

The third part of the measurement is to obtain a distance (E) defined as a horizontal distance between an outer surface of the flange (42) of the brake rotor (40) and an outer surface of the rotor base (41). Referring to FIGS. 10 to 12, the user can bear the horizontal ruler (12) against the outer surface of the flange (42). A measured distance can be obtained by using the vernier caliper penetrating through the through hole (122) of the horizontal ruler (12) to contact to the outer surface of the rotor base (41). Then, the distance (E) can be obtained by subtracting the width of the horizontal ruler (12) from the measured distance. A distance (F) defined as an optimized distance between the caliper (20) and the flange (42) can be calculated by a computer simulating the combined data of the measured distances and the sizes of equipped caliper (20) and brake disc (30). By subtracting the distance (E) from the distance (F), a distance (G) defined as a horizontal distance between a center of an engaging hole (521), which is configured to equip the caliper (20) on the engaging portion (52) of the adapter base (50), and a surface of the adapter body (51) can be obtained.

Figure 13:
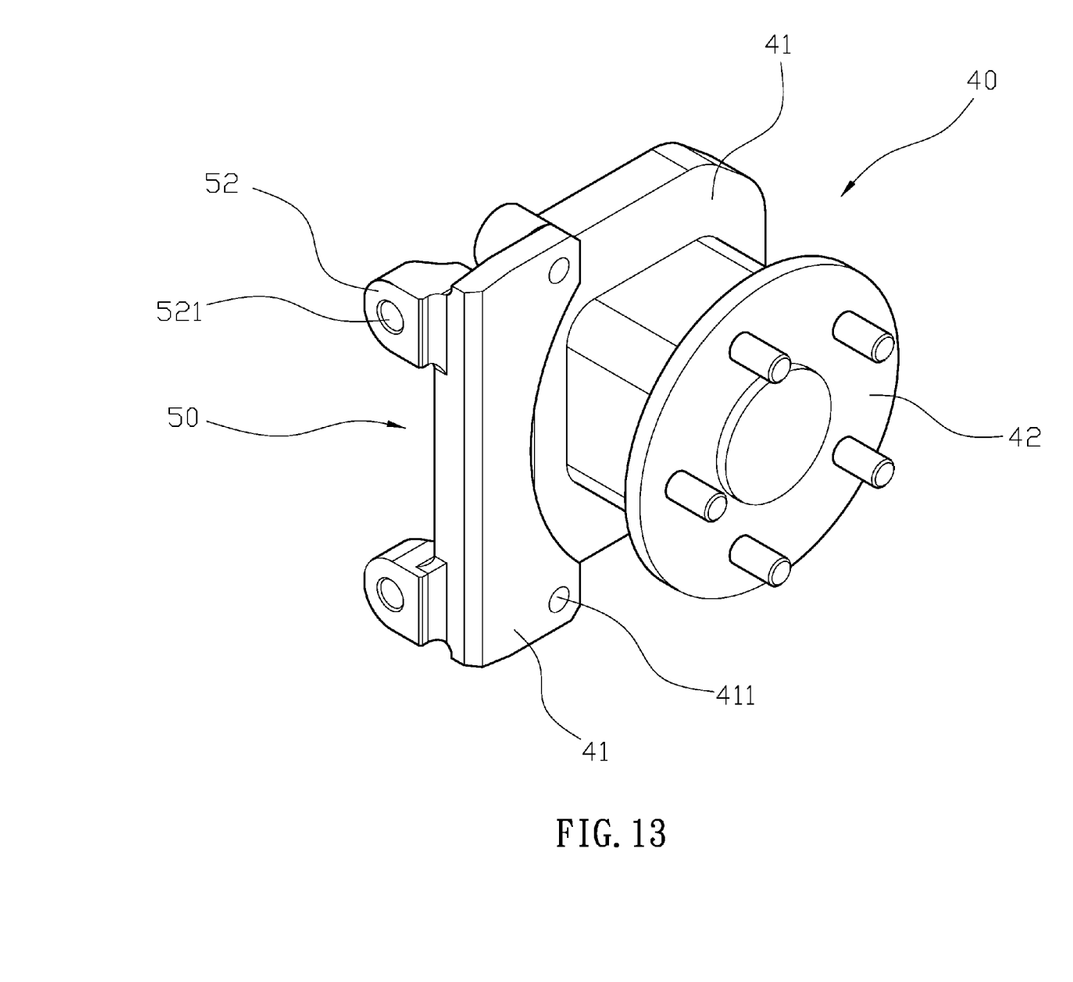
FIG. 13 is a schematic view of the brake measuring gauge and method of present invention achieving to obtain the size of the adapter base.

The precise dimension of the adapter base (50) can be obtained when the user has values of the distances (A)-(G) measured or calculated from above measurements. Specifically, according to the measurements, the user can obtain precise sizes of the adapter bases (50) (as shown in FIG. 13) for different types of the calipers (20) or the brake discs (30) to achieve the improvement of the brake system.

Comparing with conventional brake measuring gauge and method, the present invention is advantageous because: (i) by using the measuring gauge (10) to measure and calculate the dimensions of components of the brake rotor (40), the user can obtain precise sizes of the adapter bases (50) for different types of the calipers (20) or the brake discs (30). As a result, the brake measuring gauge and method can reduce the cost of measurement and save measurement time; and (ii) the precise size of the adapter base (50) can improve the stableness of the caliper (20) and the brake disc (30) thereon, and prevent the caliper (20) and the brake disc (30) from additional abrasion because of incorrect measurement, resulting in increasing the life time of the caliper (20) and the brake disc (30) and improving the brake performance.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A brake measuring gauge used to measure sizes of adapter bases for different types of calipers or brake discs in replacing process, comprising: two measuring rods and a horizontal ruler, each of the two measuring rods having at least a connecting rod formed at least one end of the measuring rod to engage with a nut, the horizontal ruler having a central hole formed at a central portion of a surface thereof, and two through holes symmetrically formed on two rear ends of the horizontal ruler, and two scales separately formed at a lateral side of the horizontal ruler, wherein a distance (A) is obtained and defined as a horizontal distance between the two connecting holes for equipping the caliper, by using the vernier caliper to obtain a distance between two measuring rods, the distance (A) can be obtained by subtracting each of two radiuses of the measuring rods from the distance between the two measuring rods;

wherein a distance (B) is obtained and defined as a horizontal distance between the connecting hole of the brake rotor and a center of the flange, a user can bear a long edge of the horizontal ruler against the two measuring rods, and calibrate both sides of the scales to be symmetric respect to the central hole, the distance between a central portion of the horizontal ruler and a center of the flange can be measured by vernier caliper, the distance (B) can be obtained by subtracting a width of the horizontal ruler and a radius of the measuring rod from the measured distance by vernier caliper, after calculating the combined date of the measured distances and the sizes of equipped caliper and brake disc a distance (D) defined as a horizontal distance between a position, configured to equip the caliper on the engaging portion of the adapter base, and the mounting hole can be obtained; and wherein obtaining a distance (E) is obtained and defined as a horizontal distance between an outer surface of the flange of the brake rotor and an outer surface of the rotor base, the user can bear the horizontal ruler against the outer surface of the flange, a distance between the horizontal ruler and an outer surface of the rotor base can be measured by vernier caliper, the distance (E) can be obtained by subtracting the width of the horizontal ruler from the measured distance by vernier caliper, after calculating the combined date of the measured distances and the sizes of equipped caliper and brake disc a distance (G) defined as a horizontal distance between a center of an engaging hole, configured to equip the caliper on the engaging portion of the adapter base, and a surface of the adapter body can be obtained.

2. The brake measuring gauge of claim 1, wherein the connecting rod formed at a first end of each of the two measuring rods is configured to receive a gasket and a sleeve.

3. The brake measuring gauge of claim 1, wherein each of the measuring rods has at least an engaging groove formed at an outer periphery thereof.

4. The brake measuring gauge of claim 3, wherein a screwing hole is formed at a second end of each of the two measuring rods to connect to a threaded rod.

5. The brake measuring gauge of claim 4, wherein a diameter of the threaded rod is smaller than the connecting rod.

6. A brake measuring method used to measure sizes of adapter bases for different types of calipers or brake discs in replacing process, comprising steps of:

obtaining a distance (A) defined as a horizontal distance between the two connecting holes for equipping the caliper, by using the vernier caliper to obtain a distance between two measuring rods, the distance (A) can be obtained by subtracting each of two radiuses of the measuring rods from the distance between the two measuring rods;

obtaining a distance (B) defined as a horizontal distance, between the connecting hole of the brake rotor and a center, of the flange, a user can bear a long edge of the horizontal ruler against the two measuring rods, and calibrate both sides of the scales to be symmetric respect to the central hole, the distance between a central portion of the horizontal ruler and a center of the flange can be measured by vernier caliper, the distance (B) can be obtained by subtracting a width of the horizontal, ruler and a radius of the measuring rod from the measured distance by vernier caliper, after calculating the combined date of the measured distances and the sizes of equipped caliper and brake disc, a distance (D) defined as a horizontal distance between a position, configured to equip the caliper on the engaging portion of the adapter base, and the mounting hole can be obtained; and obtaining a distance (E) defined as a horizontal distance between an outer surface of the flange of the brake rotor and an outer surface of the rotor base, the user can bear the horizontal ruler against the outer surface of the flange, a distance between the horizontal ruler and an outer surface of the rotor base can be measured by vernier caliper, the distance (E) can be obtained by subtracting the width of the horizontal ruler from the measured distance by vernier caliper, after calculating the combined date of the measured distances and the sizes of equipped caliper and brake disc, a distance (C) defined as a horizontal distance between a center of an engaging hole, configured to equip the caliper on the engaging portion of the adapter base, and a surface of the adapter body can be obtained.

7. The brake measuring method of claim 6, wherein the sleeve is configured to bear against an inner periphery of the connecting hole to improve the bonding force between the connecting rod and the connecting hole.

8. The brake measuring method of claim 6, wherein the size of the adapter base can be calculated by using a computer to simulate the combined date of the measured distances and the sizes of equipped caliper and brake disc.

9. The brake measuring gauge and method of claim 6, wherein the adapter base is L-shaped.

* * * * *